United States Patent [19]

Hirata

[11] Patent Number: 4,654,572

[45] Date of Patent: Mar. 31, 1987

[54] LOAD-COMMUTATED INVERTER FOR OPERATING SYNCHRONOUS MOTOR

[75] Inventor: Akio Hirata, Tokyo, Japan

[73] Assignee: Kabushiki Kaisha Toshiba, Kawasaki, Japan

[21] Appl. No.: 729,176

[22] Filed: May 1, 1985

[30] Foreign Application Priority Data

May 4, 1984 [JP] Japan .................................. 59-88359
Jun. 6, 1984 [JP] Japan ................................ 59-115712

[51] Int. Cl.$^4$ ............................................ H02P 5/40
[52] U.S. Cl. .................................... 318/722; 318/723; 318/798; 318/806
[58] Field of Search ............... 318/722, 723, 800, 798, 318/806; 363/71

[56] References Cited

U.S. PATENT DOCUMENTS

| | | | |
|---|---|---|---|
| 4,264,853 | 4/1981 | Morishita | 318/723 |
| 4,276,504 | 6/1981 | Nagase et al. | 318/722 |
| 4,309,643 | 1/1982 | Akamatsu | 318/723 |
| 4,364,004 | 12/1984 | Bourbeau | 318/722 |
| 4,392,099 | 7/1983 | Kuniyoshi | 318/803 |
| 4,426,611 | 1/1984 | Espelage et al. | 318/803 |
| 4,460,861 | 7/1984 | Rosa | 318/722 |

Primary Examiner—David Smith, Jr.
Attorney, Agent, or Firm—Oblon, Fisher, Spivak, McClelland & Maier

[57] ABSTRACT

A load-commutated inverter for operating a synchronous motor having two sets of 3-phase windings. The difference of phase angles between the two sets of the 3-phase windings is 30 degrees. The load-commutated inverter is provided with two sets of inverters and a control circuit. Each of the inverters, is formed of thyristors. The inverters are coupled respectively to the 3-phase windings of the motor. The commutation of each of the thyristors is controlled in accordance with a given advanced control angle. The control circuit is coupled to the inverters and is responsive to a commutation overlapping angle of currents (e.g., IU1, IV1 in FIG. 4A) supplied from the inverters to the 3-phase windings of the motor. The control circuit adjusts the given advanced control angle so as to retain a relation:

$$u + \gamma^* \leq 30 \text{ degrees}$$

wherein u denotes the commutation overlapping angle and $\gamma^*$ corresponds to the reverse-biasing time applied to each of the thyristors.

13 Claims, 17 Drawing Figures

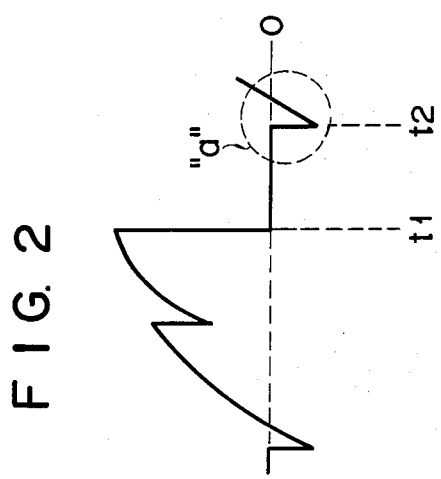
FIG. 2
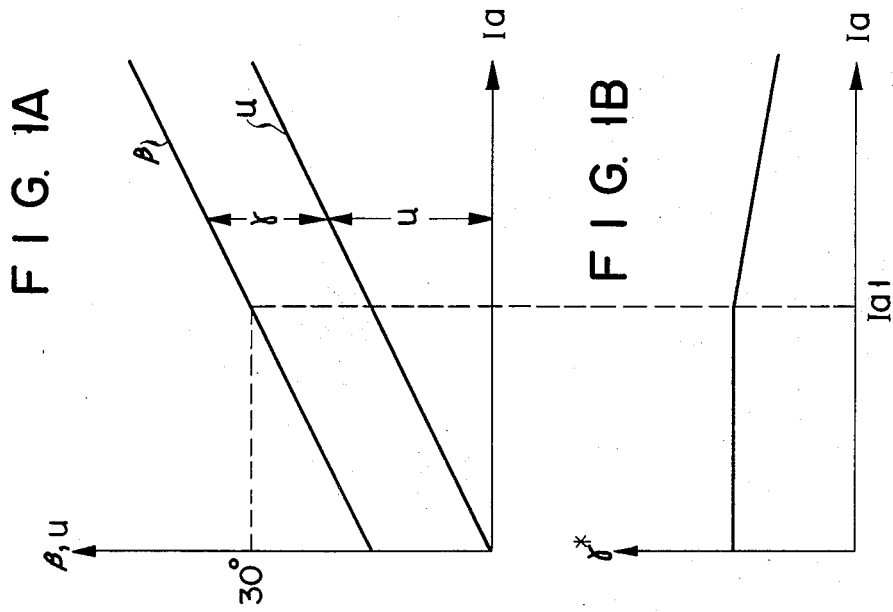
FIG. 1A
FIG. 1B

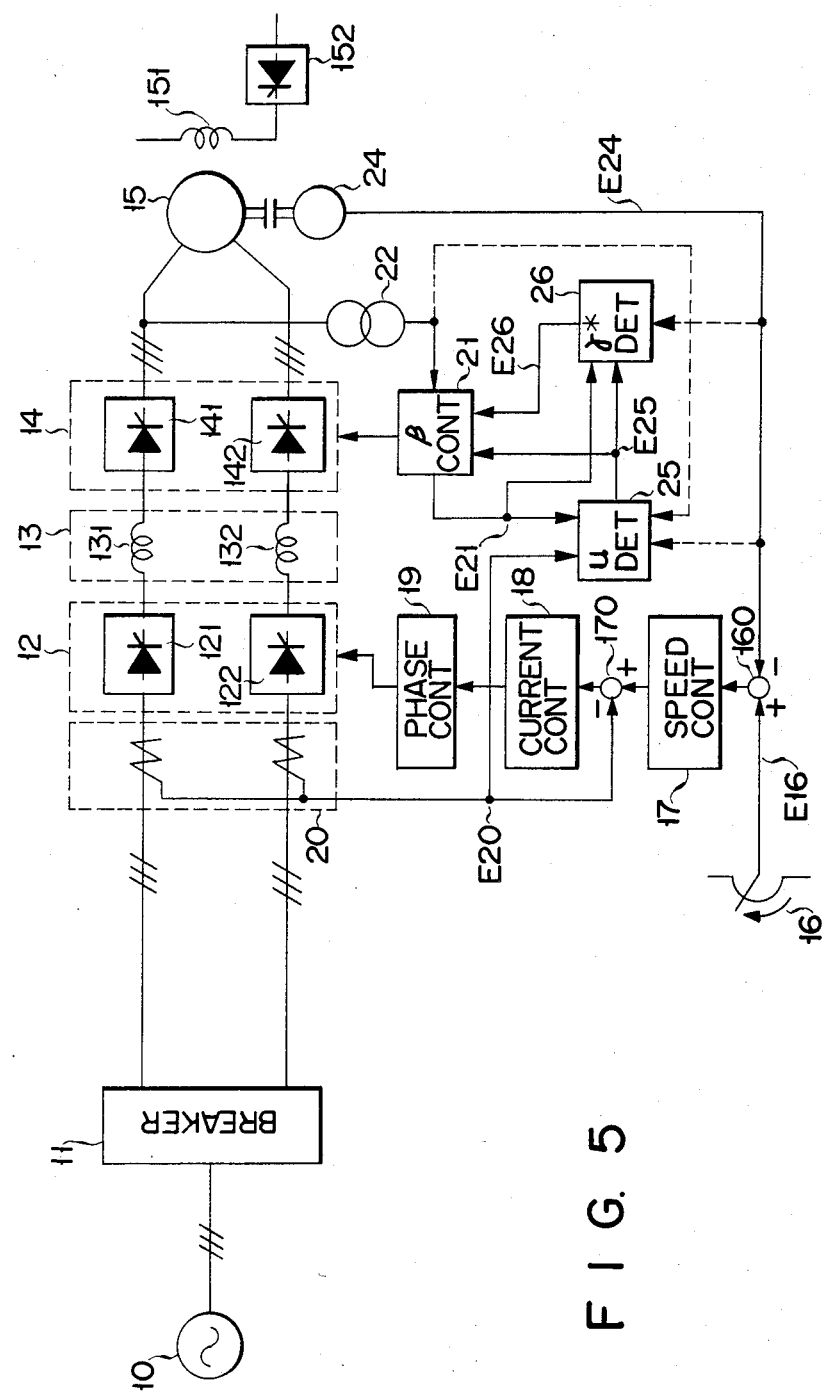
F I G. 5

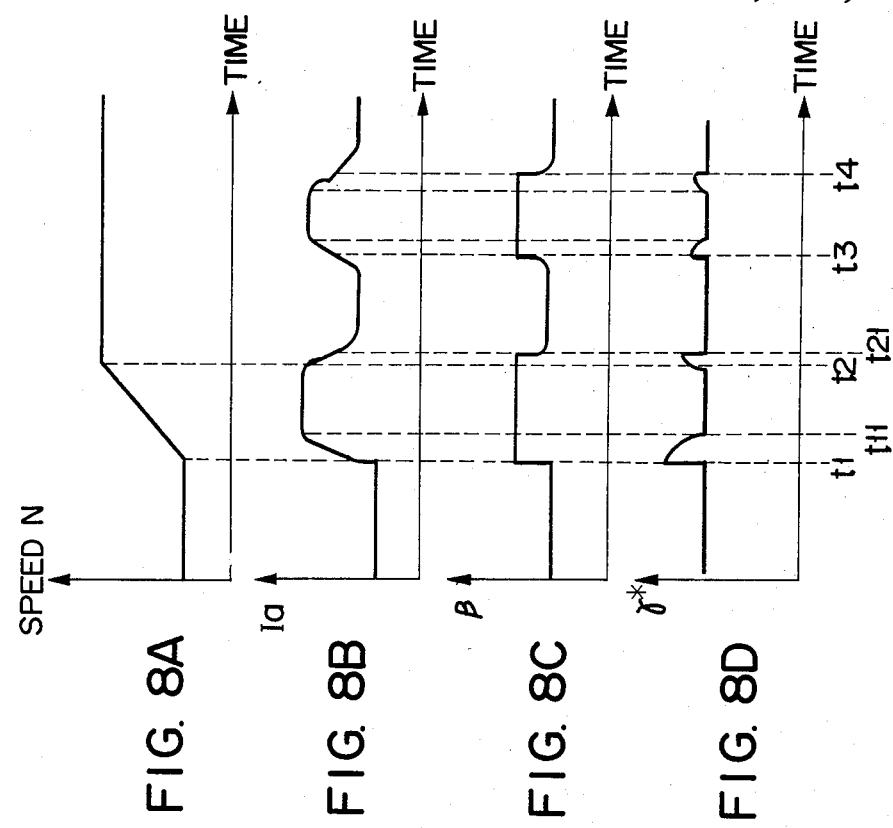
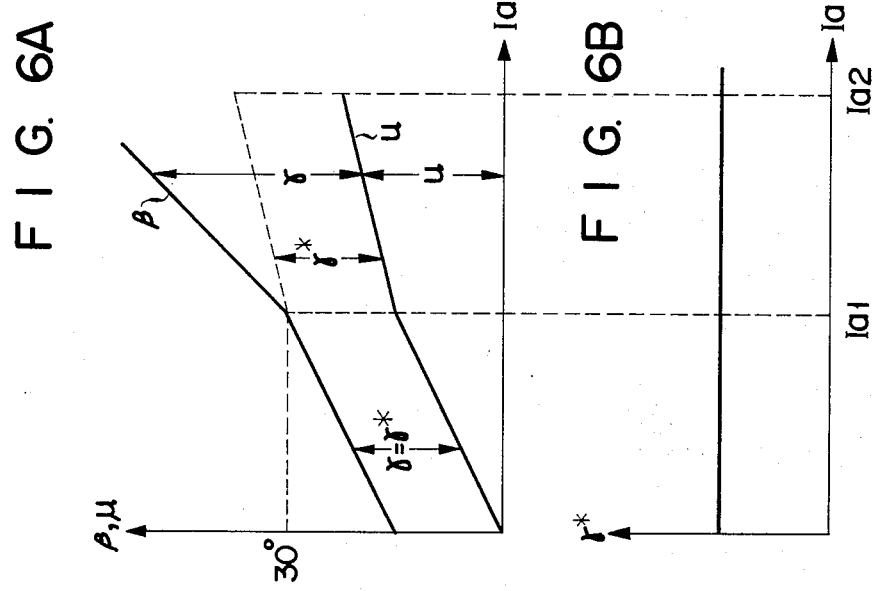

LOAD-COMMUTATED INVERTER FOR OPERATING SYNCHRONOUS MOTOR

BACKGROUND OF THE INVENTION

The present invention relates to an AC motor control device driven by n (n≧2) inverters. More particularly, the present invention relates to a load-commutated inverter (to be referred to as a thyristor motor hereinafter) for operating a synchronous motor having one or more sets of three-phase windings, wherein a deviation in electrical angles of 60 degrees/n exists in the outputs from the n inverters.

A thyristor motor comprises a combination of a static frequency converter and a synchronous motor. A thyristor motor has advantages common to those of an AC motor, i.e., easy maintenance and high reliability. At the same time, a thyristor motor allows variable operation within a wide range of speed as in the case of a DC motor by changing the frequency of the converter. In a thyristor motor of this type, in order to prevent commutation failure of the converter, the advanced control angle of the thyristor is automatically adjusted. A control device for the thyristor motor automatically adjusted in this manner is disclosed, e.g., in Japanese Patent Publication No. 55-27556 (July 21, 1980). In this conventional control device, the advanced control angle of the thyristor is controlled such that the commutation margin angle is kept constant.

However, in a thyristor motor wherein a synchronous motor having one or more sets of three-phase windings is driven by n (n≧2) inverters, a problem is encountered if the above-mentioned control method is adopted. This problem will be described with reference to a case wherein n=2 (60 degrees/n=30 degrees).

FIG. 1A shows changes in an advanced control angle $\beta$ and a commutation overlapping angle u in a conventional thyristor motor for a synchronous motor having two sets of three-phase windings. Each of angles $\beta$ and u is shown as a function of current Ia which represents the value of currents flowing in the windings of the respective phases. These changes are such that the commutation margin angle $\gamma$ ($=\beta-u$) is kept constant. Referring to FIG. 1A, 30 degrees along the axis of ordinate represents an electrical angle corresponding to the phase deviation between the two sets of three-phase windings.

FIG. 1B shows changes in the effective commutation margin angle $\gamma^*$ as a function of current Ia. Note that the effective commutation margin angle $\gamma^*$ is an electrical angle corresponding to an actual reverse biasing voltage for commutating thyristors in each inverter. Referring to FIG. 1B, Ia1 along the axis of abscissa represents the value of current when advanced control angle $\beta$ is 30 degrees.

FIGS. 1A and 1B teach that when advanced control angle $\beta$ exceeds 30 degrees during $\gamma$-constant control, effective margin angle $\gamma^*$ is reduced and thyristor commutation is rendered unreliable. In other words, the conventional thyristor motor cannot guarantee stable operation in the control range of $\beta > 30$ degrees.

Effective commutation margin angle $\gamma^*$ is reduced in the control region exceeding 30 degrees for the following reasons:

FIG. 2 shows an example of a voltage waveform applied to the thyristor. Referring to FIG. 2, when one thyristor in the inverter is considered, it is turned on at time t1 and is turned off after time t2. In FIG. 2, region "a" indicates a reverse biasing portion for forcibly turning off the thyristor. When the reverse biasing portion "a" is enlarged, it is as shown in FIG. 3C ($\beta < 30$ degrees) or in FIG. 4C ($\beta \geq 30$ degrees).

FIGS. 3A and 3B show changes in the motor current which are related to the reverse biasing voltage in FIG. 3C. FIGS. 4A and 4B show changes in the motor current which are related to the reverse biasing voltage waveform shown in FIG. 4C. FIGS. 3A and 4A show the relationship between a current IU1 flowing to the phase U1 of the first set of windings (U1, V1 and W1) and a current IV1 flowing to the V1 phase thereof. FIGS. 3B and 4B show the relationship between a current IU2 flowing to the U2 phase of the second set of windings (U2, V2 and W2) and a current IV2 flowing to the V2 phase thereof. The second set of three-phase windings has a phase deviation of 30 degrees with respect to the first set of three-phase windings.

As may be seen in FIGS. 3A to 3C, when the values of currents IU1, IV1, IU2 and IV2 are small (corresponding to the case of Ia < Ia1 in FIG. 1B), a constant commutation margin angle $\gamma$ is obtained within a range of $\beta < 30$ degrees. In this case, control is performed such that $\gamma$ ($=\beta-u$)$=\gamma^*$=constant, and the thyristor is operated stably.

As shown in FIGS. 4A to 4C, when the values of currents IU1, IV1, IU2 and IV2 increase (corresponding to the case of Ia $\beta$ Ia1 in FIG. 1B), commutation overlapping angle u also increases and angle $\beta$ exceeds 30 degrees while performing $\gamma$-constant control. Then, a voltage change (having the opposite polarity to that of the reverse biasing voltage of the thyristor) occurring from the motor upon commutation from current IU2 to IV2 overlaps or breaks into the region of commutation margin angle $\gamma$ (FIGS. 4B and 4C). For this reason, the electrical angle which corresponds to the actual reverse biasing voltage period used for commutation from the U1 phase to the V1 phase becomes $\gamma^*$ ($\gamma=\beta-u>\gamma^*$) which is smaller than constant $\gamma$.

In the $\beta$ control region exceeding 30 degrees, effective commutation margin angle $\gamma^*$ becomes smaller than the constant, nominal commutation margin angle $\gamma$. Accordingly, if the control target of commutation margin angle $\gamma$ is set to a value corresponding to the minimum time required for commutation of the thyristor, commutation failure occurs and stable thyristor motor operation cannot be performed in the control region of $\beta > 30$ degrees. However, if the control target of angle $\gamma$ is set to be sufficiently larger than the above-mentioned minimum value so as to prevent such commutation failure, the reverse biasing voltage application period becomes excessively long for the region of $\beta < 30$ degrees and the efficiency (or power factor) of the thyristor motor is lowered. The above is the first disadvantage of the conventional thyristor motor of $\gamma$-constant control type.

When rotational speed N and/or the load of the motor abruptly changes, in the conventional thyristor motor, the control operation of advanced control angle cannot follow such an abrupt change. In this case, effective commutation margin angle $\gamma^*$ may temporarily decrease during this period and commutation failure may occur. This is the second disadvantage of the conventional thyristor motor which does not incorporate any measure against abrupt change in rotational speed/load of the motor.

Note that the second disadvantage described above also occurs in a thyristor motor wherein a synchronous motor having one set of three-phase windings is driven by a single inverter. However, this disadvantage is more critical in a thyristor motor wherein a synchronous motor having one or more sets of three-phase windings is driven by n (n≧2) inverters. A thyristor motor of n≧2 is required irrespective of the first disadvantage because ripples in the generated torque obtained in the case of n≧2 are lower than those obtained in the case of n=1.

SUMMARY OF THE INVENTION

It is accordingly a primary object of the present invention to provide a thyristor motor for a synchronous motor having one or more sets of three-phase windings, wherein the motor is driven by n (n≧2) inverters, a deviation of 60 degrees/n in electrical angles exists in outputs from the n inverters and commutation failure is prevented in a control region of an advanced control angle $\beta$ exceeding 60 degrees/n.

It is another object of the present invention to prevent commutation failure in a period wherein advanced control angle $\beta$ cannot follow an abrupt change in a rotational speed and/or load of the thyristor motor.

To achieve the former object of the invention, an effective commutation margin angle $\gamma^*$ is set to be a predetermined value in a predetermined control region in which an advanced control angle $\beta$ exceeds 60 degrees/n (n≧2). In other words, when a commutation overlapping angle is given by u, $\beta$ control is performed so as to satisfy the relation $u+\gamma^* \leq 60$ degrees/n.

To achieve the latter object of the invention, in a transient period (e.g., t1-t21 in FIGS. 8A to 8D) wherein the speed and/or load of the thyristor motor abruptly changes, a predetermined value (e.g., an output from a commutation overlapping angle setting potentiometer 28) being independent of such an abrupt change is used to determine a control target of effective commutation margin angle $\gamma^*$.

BRIEF DESCRIPTION OF THE DRAWINGS

FIGS. 1A and 1B are graphs showing the control characteristics of a conventional thyristor motor;

FIG. 2 shows part of a voltage waveform applied to a thyristor in the thyristor motor;

FIG. 5 is a block diagram showing the configuration of a thyristor motor according to an embodiment of the present invention;

FIGS. 6A and 6B are graphs showing the control characteristics of the thyristor motor shown in FIG. 5;

FIGS. 8A to 8D are timing charts for explaining the operation of the thyristor motor shown in FIG. 7.

DETAILED DESCRIPTION OF THE PREFERRED EMBODIMENTS

Figure 3A:
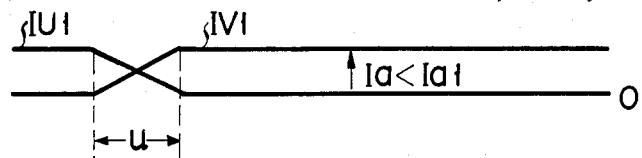
FIGS. 3A to 3C show changes in commutation margin angle $\gamma$ when advanced control angle $\beta$ is below 30 degrees.
Figure 3B:
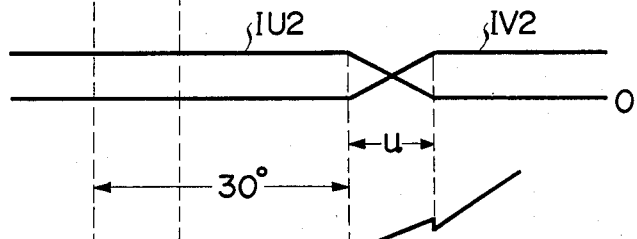

FIG. 5 shows an embodiment of a thyristor motor for achieving the primary object of the present invention. FIG. 5 shows a configuration wherein two inverters 141 and 142 drive synchronous motor 15 having two sets of three-phase windings.

An AC power from 3-phase AC power source 10 is supplied to a rectifier 12 through a breaker 11. Rectifier 12 is formed with two converters 121 and 122 each comprising switching elements such as thyristors. The thyristors are on/off controlled by a phase controller 19 so that converters 121 and 122 convert two sets of three-phase AC power from breaker 11 into two sets of DC power.

Phase control by controller 19 is performed in accordance with the level of an output signal from a current controller 18. The output signal level from controller 18 is determined by the output level from a difference circuit 170. The level of an output signal from circuit 170 corresponds to the difference between an output E20 from a current transformer 20 and an output from a speed controller 17. Transformer 20 is arranged at the AC input current path of rectifier 12.

An output from controller 17 is determined by an output from a difference circuit 160. The level of an output signal from difference circuit 160 corresponds to the difference between an output (reference speed signal) E16 from a speed setting potentiometer 16 and an output E24 from a speed detector 24. Detector 24 is connected to a synchronous motor 15 to provide output E24 which contains information on the rotor position (electrical angle) of motor 15. Output E24 also contains information corresponding to a rotational speed N of motor 15.

The two sets of DC power from rectifier 12 are supplied to an inverter 14 through a DC reactor 13. Reactor 13 includes DC reactors 131 and 132 and inverter 14 includes inverters 141 and 142, in correspondence with converters 121 and 122 of rectifier 12, respectively. Inverters 141 and 142 comprise switching elements such as thyristors. The switching elements (thyristors) are turned on or off by an advanced control angle $\beta$ controller 21. Upon this ON/OFF control, inverters 141 and 142 convert two sets of DC input power into two sets of three-phase AC power with a predetermined frequency and a phase deviation of 30 degrees. The two sets of three-phase AC power are respectively supplied to the two sets of three-phase windings of motor 15 (U1, V1 and W1; and U2, V2 and W2; not shown). A field winding 151 of motor 15 is excited by a field converter 152 separately provided.

Figure 4A:
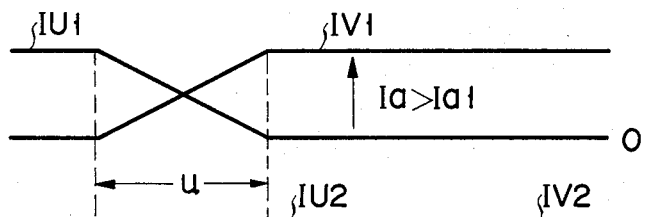
FIGS. 4A to 4C show changes in effective commutation margin angle $\gamma^*$ when advanced control angle $\beta$ exceeds 30 degrees.
Figure 4B:
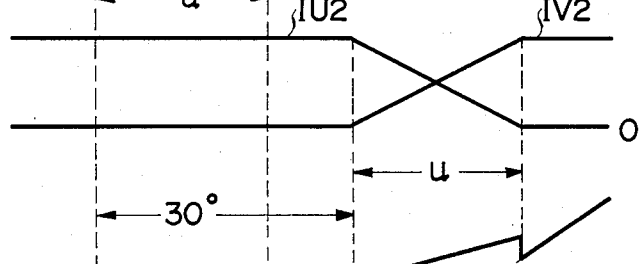

Advanced control angle $\beta$ controller 21 determines an advanced control angle $\beta$ in accordance with an output E22 from a potential transformer 22, an output E25 from a commutation overlapping angle u detector 25, and an output E26 from an effective commutation margin angle $\gamma^*$ detector 26. Potential transformer 22 is coupled to the AC input circuit of motor 15 and provides output E22 corresponding to the AC line voltage of motor 15. Output E26 of $\gamma^*$ detector 26 contains information ($\beta-u$ or 30 degrees$-u$) of a commutation margin angle to be controlled. Output E25 from u detector 25 contains information on the magnitude of a commutation overlapping angle u and information indicating the commutation start timing (e.g., the timing at which current IU1 starts to decrease in FIG. 4A).

Detector 25 calculates commutation overlapping angle u based on output E20 from current transformer 20 and on output E21 from $\beta$ controller 21, and it produces output E25 corresponding to angle u. More specifically, u detector 25 calculates according to the following equation:

$$u = \beta - \cos^{-1}(\cos\beta + (\sqrt{2}\ Xc \cdot Idc)/EM) \quad (1)$$

where $\beta$ is the value of the advanced control angle contained in output E21, EM is the voltage induced from motor 15, Xc is the reactance of the windings of motor 15, and Idc is a $\sqrt{3}/2$ multiple of a winding input current Ia of motor 15 which is determined from output E20.

Commutation overlapping angle u may be obtained from the following equation:

$$u = \cos^{-1}(\cos\gamma - (\sqrt{2}\ Xc \cdot Idc)/EM) - \gamma \quad (2)$$

where $\gamma$ is the value of the commutation margin angle represented by $\beta - u$ and other parameters are the same as given for equation (1).

Detector 26 checks whether angle $\beta$ has exceeded 30 degrees according to output E21 ($=\beta$) from $\beta$ controller 21 and a given preset value corresponding to the electrical angle of 30 degrees. If $\beta < 30$ degrees (or $\beta \leq 30$ degrees), detector 26 performs a subtraction based on output E21 ($=\beta$) from $\beta$ controller 21 and output E25 ($=u$) from u detector 25. Detector 26 supplies $\beta$ controller 21 with output E26 which corresponds to commutation margin angle $\gamma$ ($=\gamma^*$) representing the difference $\beta - u$. In this case, controller 21 controls inverter 14 so that $\gamma$ ($=\beta - u$) is kept constant (cf. FIG. 3C).

When it is determined that $\beta > 30$ degrees, detector 26 performs a subtraction based on output E25 ($=u$) from u detector 25 and the preset value of the electrical angle 30 degrees. Detector 26 supplies controller 21 with output E26 which corresponds to effective commutation margin angle $\gamma^*$ ($\neq \gamma$) representing the difference (30 degrees$-u$). In this case, $\beta$ controller 21 controls inverter 14 so that $\gamma^*$ ($=30$ degrees$-u$) is kept constant (cf. FIG. 4C).

Controller 21 on/off controls the thyristors in inverters 141 and 142 according to output E26 from $\gamma^*$ detector 26 ($=\beta - u$ or 30 degrees$-u$) and output E25 from u detector 25 (information on the commutation start timing). In this manner, not only in the region wherein advanced control angle $\beta$ is smaller than 30 degrees but also in the region wherein advanced control angle $\beta$ is larger than 30 degrees, $\beta$ control for obtaining predetermined effective commutation margin angle $\gamma^*$ is achieved.

FIGS. 6A and 6B show the characteristics of the embodiment shown in FIG. 5 obtained by the above-mentioned $\beta$ control. More specifically, in the region wherein $\beta < 30$ degrees (or Ia$<$Ia1), $\gamma$-constant control similar to that shown in FIGS. 1A and 1B is performed. In the region wherein $\beta > 30$ degrees (or Ia$>$Ia1), $\beta$ and u are automatically adjusted so that angle $\gamma^*$ ($=30$ degrees$-u$) is kept constant, unlike the case of FIG. 1A. In other words, $\beta$ control satisfying the relation $u + \gamma^* \leq 30$ degrees is performed within a predetermined control region including a region of $\beta > 30$ degrees. Therefore, if the control target of angle $\gamma^*$ is set to be a minimum value (or a value slightly larger than this) required for reliable commutation of the respective thyristors in inverter 14, a highly stable thyristor motor operation can be performed with a high efficiency (or high power factor) within a predetermined region (e.g., Ia$<$Ia2 in FIG. 6B) wherein $\gamma^*$-constant control is performed. The $\gamma^*$ control target which is the minimum required value described above generally corresponds to an electrical angle corresponding to several hundreds of microseconds. However, this value may be changed as needed.

Figure 3C:
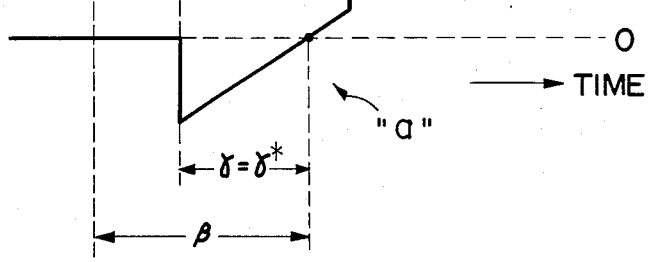
Figure 4C:
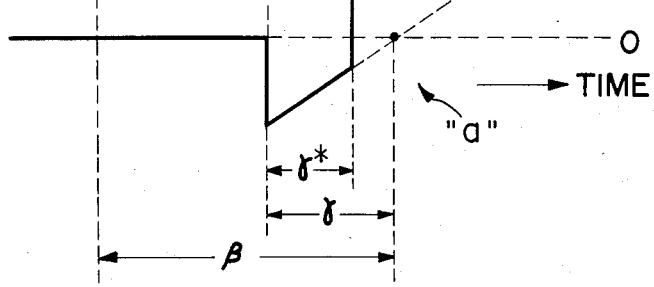

In the above embodiment, effective commutation margin angle $\gamma^*$ is kept constant. However, $\beta$ control can be performed such that the effective commutation margin time corresponding to angle $\beta^*$ is kept constant. The control target of this effective commutation margin time constant control can be obtained by dividing, in $\gamma^*$ detector 26, angle $\gamma^*$ by output E24 from speed detector 24 (in this case, output E24 is supplied to $\gamma^*$ detector 26 in FIG. 5 through the dotted signal line). The effective commutation margin time constant control is suitable in a high-speed operation region of the thyristor motor wherein the reverse biasing voltage shown in FIG. 3C or 4C is high.

In a low-speed operation region of the thyristor motor, the reverse biasing voltage is low. Then, the magnitude of the reverse biasing voltage becomes unstable due to ripple components in the DC voltage from reactor 13. To avoid unstable application of the reverse biasing voltage, $\gamma^*$-constant control may be performed only in a prescribed winding current region or a prescribed operating frequency region.

According to the FIG. 5 configuration, through the signal line indicated by the dotted line, output E24 from speed detector 24 and output E22 from potential transformer 22 may be supplied to commutation overlapping angle u detector 25 in order to calculate overlapping angle u from outputs E24 and E22. Otherwise, the value of u may be directly calculated from output E22 from transformer 22.

Figure 7:
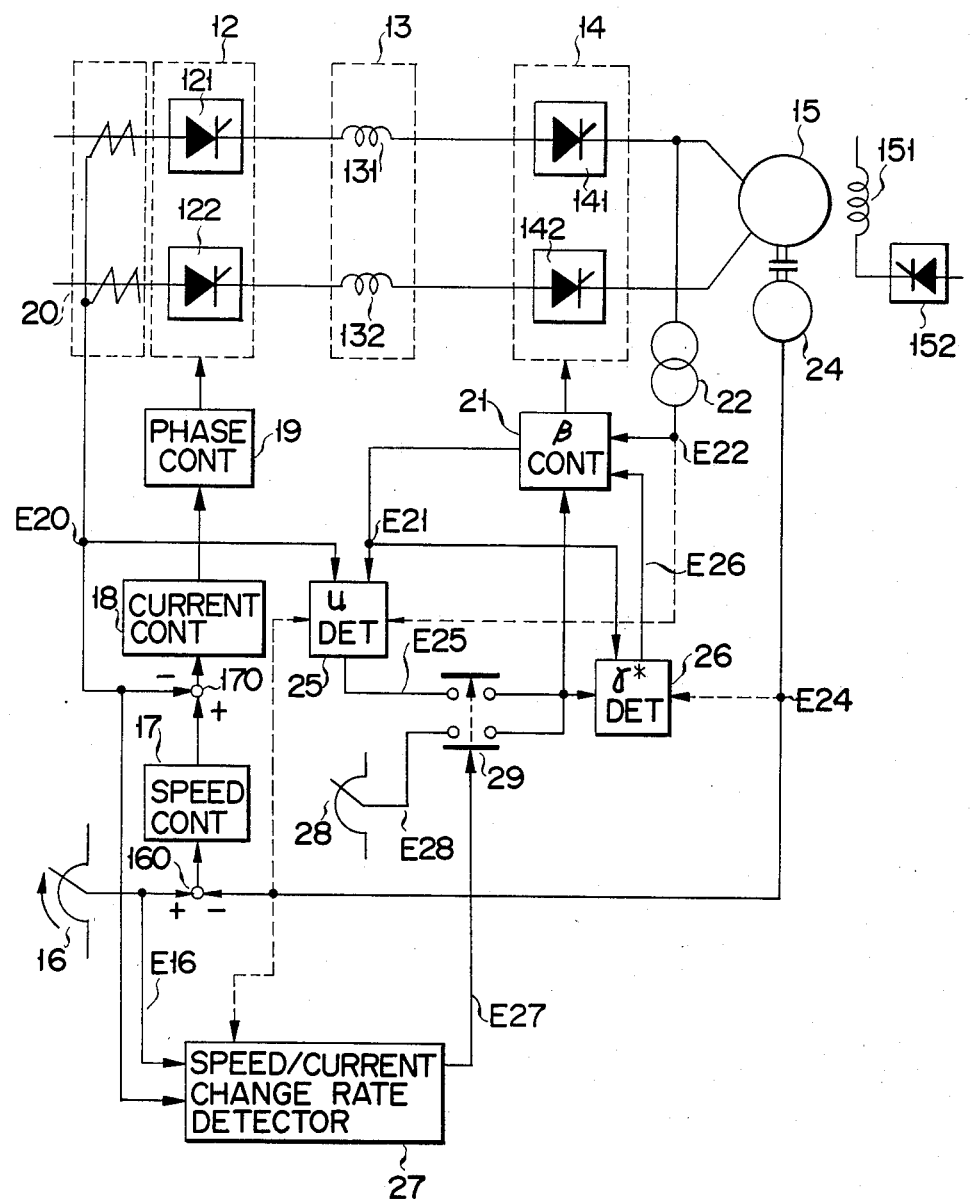
FIG. 7 is a block diagram showing the configuration of a thyristor motor according to another embodiment of the present invention.

FIG. 7 shows an embodiment of a thyristor motor for achieving said another object of the invention. In the following description, to avoid redundant description, the same reference numerals as in FIG. 5 are used to denote the same portions and only different or characteristic portions will be described.

In the embodiment shown in FIG. 7, output E16 from speed setting potentiometer 16 and output E20 from current transformer 20 are supplied to a speed/current change rate detector 27. Detector 27 produces a switching signal E27 when the absolute value ($|dN/dt|$ or $|dIa/dt|$) of the rate of change in potential of output E16 and/or output E20 exceeds a predetermined value. Output E16 corresponds to rotational speed N of motor 15, and output E20 corresponds to winding current Ia of motor 15. Therefore, if signal E27 is generated, it means that the magnitude $|dN/dt|$ of the rate of change in speed or that $|dIa/dt|$ of the rate of change in current has exceeded a predetermined value. ($|dN/dt|$ may be obtained from output E24 from speed detector 24.) Signal E27 is used for performing ON/OFF control of a switch 29.

When signal E27 is generated, switch 29 selects either an output E25 from detector 25 or an output E28 from a commutation overlapping angle setting potentiometer 28. Then, switch 29 supplied the selected output to advanced control angle $\beta$ controller 21 and to effective commutation margin angle $\gamma^*$ detector 26. In this manner, when the rate of change in the speed $|dN/dt|$ and/or the rate of change in current $|dIa/dt|$ exceeds a predetermined value and switch signal E27 is generated, $\beta$ controller 21 and $\gamma^*$ detector 26 receive output E28 from potentiometer 28 in place of output E25 from u detector 25. The $\beta$ control in this case is performed based on constant output E28. When the rate $|dN/dt|$ and/or $|dIa/dt|$ decreases below the predetermined value and signal E27 disappears, $\beta$ controller 21 and $\gamma^*$ detector 26 receive output E25 from u detector 25. In this case, $\beta$ control ($\gamma^*$ constant control) similar to that performed in the FIG. 5 embodiment is performed.

The thyristor motor shown in FIG. 7 performs the following operation when rotational speed N of motor 15 abruptly changes. FIGS. 8A to 8D show the timing charts explaining this operation.

After time t1, when speed N, which has been kept constant, abruptly increases (FIG. 8A), the rate of change in speed dN/dt results in an abrupt increase in winding current Ia of motor 15 (FIG. 8B). In this case, in response to the rate dN/dt and/or dIa/dt at time t1, detector 27 generates switching signal E27. Then, $\beta$ controller 21 and $\gamma^*$ detector 26 perform $\beta$ control (FIG. 8C) and $\gamma^*$ control (FIG. 8D) in accordance with output E28 from potentiometer 28. Upon this control operation, effective commutation margin angle $\gamma^*$ which has instantaneously increased by the change in current Ia at time t1 returns to the predetermined value (t11 in FIG. 8D).

In the interval between times t1 and t2 (FIG. 8A), the magnitude $|dN/dt|$ of the rate of change in speed N is larger than the predetermined value. Therefore, $\beta$ control and $\gamma^*$ control are performed based on output E28 from commutation overlapping angle setting potentiometer 28.

When speed N, which has been changing, becomes constant at time t2 in FIG. 8A, rotation of motor 15 is no longer accelerated and winding current Ia begins to decrease (t2 in FIG. 8B). Upon this change in current Ia, angle $\gamma^*$ temporarily increases by a slight value. However, when the change in current Ia is eliminated, angle $\gamma^*$ returns to the predetermined value (t21 in FIG. 8D).

When there is no change in dN/dt or in dIa/dt after time t21 in FIG. 8A, detector 27 stops the generation of signal E27. Then, switch 29 supplies output E25 from u detector 25 to $\beta$ controller 21 and to $\gamma^*$ detector 26. By time t2, u detector 25 has completed the calculation of new commutation overlapping angle u based on equation (1) or (2). Therefore, after time t21, $\beta$ control and $\gamma^*$ control being the same as before time t1 are performed.

When the magnitude of the motor load acting on motor 15 abruptly increases during operation of the thyristor motor, winding current Ia also abruptly increases in correspondence with this change in load (t3 to t4 in FIG. 8B). The change in current dIa/dt is detected by detector 27. In the change interval of current Ia indicated by times t3 to t4 in FIG. 8B, the $\beta$ control (FIG. 8C) and $\gamma^*$ control (FIG. 8D) being the same as that performed in the interval between times t1 and t2 are performed based on constant output E28 from potentiometer 28.

Incidentally, detector 27 may generate switching signal E27 in correspondence with the magnitude of current Ia, instead of rate dN/dt or dIa/dt.

As can be seen from the above description, in the embodiment shown in FIG. 7, during the transient period (t1 to t21, t3 to t4, and the like in FIG. 8C) wherein detector 25 performs the calculation of overlapping angle u; $\beta$ control and $\gamma^*$ control are performed according to constant signal E28 in place of output E25 from u detector 25. From this, even if speed N and/or current Ia of motor 15 changes abruptly so that u detector 25 cannot follow such change, $\beta$ control and $\gamma^*$ control are performed based on predetermined signal E28 during the period of such abrupt change, and effective commutation margin angle $\gamma^*$ will not be decreased below the predetermined value. Therefore, even if N, Ia and/or load of the motor changes, commutation failure of the thyristor will not be caused.

In order to provide a sufficient disclosure of the present application, the following U.S. patents are incorporated in the present application:

(1) U.S. Pat. No. 4,264,853 Issued on Apr. 28, 1981, "COMMUTATORLESS MOTOR DEVICE"
(2) U.S. Pat. No. 4,309,647 Issued on Jan. 5, 1982, "COMMUTATORLESS MOTOR DEVICE"
(3) U.S. Pat. No. 4,417,193 issued on Nov. 22, 1983, "METHOD AND APPARATUS FOR CONTROLLING ALTERNATING CURRENT MOTORS"

Incidentally, when a synchronous motor having one set of three-phase windings is driven by n (n≧2) inverters, the respective outputs of these n inverters are combined via star/delta transformers or the like in a conventional manner, and the combined inverter output from the transformers is supplied to the one set of the motor windings.

What is claimed is:

1. A load-commutated inverter for operating a synchronous motor which includes one or more sets of 3-phase windings, said load-commutated inverter comprising:

n sets of inverters, each being formed with switching elements, coupled respectively to said 3-phase windings, the commutation of each of said switching elements being controlled in accordance with a given advanced control angle, said n being an integer which is equal to or more than 2, and a difference of phase angles between outputs from the n sets of said inverters being substantially 60 degrees/n; and control circuit means, coupled to the n sets of said inverters, for adjusting a specific parameter, $\gamma^*$, to a given target value when said given advanced control angle exceeds a value corresponding to said 60 degrees/n, said specific parameter representing a reverse-biasing time applied to each of said switching elements, and said given target value representing a time required to achieve a complete commutation of each of said switching elements, said control circuit means including $\beta$ means, coupled to the n sets of said inverters, for adjusting the value of said given advanced control angle to control the on/off timing of each of said switching elements; u means for detecting a commutation overlapping angle of currents supplied from said inverters to the 3-phase windings of said motor; and $\gamma^*$ means, coupled to said $\beta$ means and said u means, for comparing the phase angle of 60 degrees/n with said given advanced control angle, and supplying said $\beta$ means with a control signal representing a difference between said 60 degrees/n and said commutation overlapping angle when said given advanced control angle exceeds said 60 degrees/n, thereby achieving the adjustment of said specific parameter.

2. A load-commutated inverter according to claim 1, wherein said $\gamma^*$ means supplies said $\beta$ means with another control signal representing a difference between said given advanced control angle and said commutation overlapping angle when said given advanced control angle falls below said 60 degrees/n, thereby achieving the adjustment of said specific parameter.

3. A load-commutated inverter according to claim 1, further comprising:
   speed change rate detector means for detecting the rate of change of a rotation speed of said synchronous motor, and generating a switch signal when the rotation speed change rate exceeds a prescribed value; and
   signal means, coupled to said speed change rate detector means and said $\gamma^*$ means, for supplying said $\gamma^*$ means with a predetermined signal when said switch signal is generated, said predetermined signal being independent of said commutation overlapping angle, thereby achieving the commutation of said switching elements independently of the value of said commutation overlapping angle.

4. A load-commutated inverter according to claim 2, further comprising:
   speed change rate detector means for detecting the rate of change of a rotation speed of said synchronous motor, and generating a switch signal when the rotation speed change rate exceeds a prescribed value; and
   signal means, coupled to said speed change rate detector means and said $\gamma^*$ means, for supplying said $\gamma^*$ means with a predetermined signal when said switch signal is generated, said predetermined signal being independent of said commutation overlapping angle, thereby achieving the commutation of said switching elements independently of the value of said commutation overlapping angle.

5. A load-commutated inverter according to claim 1, further comprising:
   current change rate detector means for detecting the rate of change of a current of said synchronous motor, and generating a switch signal when the current change rate exceeds a prescribed value; and
   signal means, coupled to said current change rate detector means and said $\gamma^*$ means, for supplying said $\gamma^*$ means with a predetermined signal when said switch signal is generated, said predetermined signal being independent of said commutation overlapping angle, thereby achieving the commutation of said switching elements independently of the value of said commutation overlapping angle.

6. A load-commutated inverter according to claim 2, further comprising:
   current change rate detector means for detecting the rate of change of a current of said synchronous motor, and generating a switch signal when the current change rate exceeds a prescribed value; and
   signal means, coupled to said current change rate detector means and said $\gamma^*$ means, for supplying said $\gamma^*$ means with a predetermined signal when said switch signal is generated, said predetermined signal being independent of said commutation overlapping angle, thereby achieving the commutation of said switching elements independently of the value of said commutation overlapping angle.

7. A load-commutated inverter according to claim 3, further comprising:
   current change rate detector means for detecting the rate of change of a current of said synchronous motor, and generating a switch signal when the current change rate exceeds a prescribed value; and
   signal means, coupled to said current change rate detector means and said $\gamma^*$ means, for supplying said $\gamma^*$ means with a predetermined signal when said switch signal is generated, said predetermined signal being independent of said commutation overlapping angle, thereby achieving the commutation of said switching elements independently of the value of said commutation overlapping angle.

8. A load-commutated inverter according to claim 4, further comprising:
   current change rate detector means for detecting the rate of change of a current of said synchronous motor, and generating a switch signal when the current change rate exceeds a prescribed value; and
   signal means, coupled to said current change rate detector means and said $\gamma^*$ means, for supplying said $\gamma^*$ means with a predetermined signal when said switch signal is generated, said predetermined signal being independent of said commutation overlapping angle, thereby achieving the commutation of said switching elements independently of the value of said commutation overlapping angle.

9. A load-commutated inverter according to claim 1, further comprising:
   current detector means for detecting the amount of a current of said synchronous motor, and generating a switch signal when the current amount exceeds a prescribed value; and
   signal means, coupled to said current detector means and said $\gamma^*$ means, for supplying said $\gamma^*$ means with a predetermined signal when said switch signal is generated, said predetermined signal being independent of said commutation overlapping angle, thereby achieving the commutation of said switching elements independently of the value of said commutation overlapping angle.

10. A load-commutated inverter according to claim 2, further comprising:
    current detector means for detecting the amount of a current of said synchronous motor, and generating a switch signal when the current amount exceeds a prescribed value; and
    signal means, coupled to said current detector means and said $\gamma^*$ means, for supplying said $\gamma^*$ means with a predetermined signal when said switch signal is generated, said predetermined signal being independent of said commutation overlapping angle, thereby achieving the commutation of said switching elements independently of the value of said commutation overlapping angle.

11. A load-commutated inverter according to claim 3, further comprising:
    current detector means for detecting the amount of a current of said synchronous motor, and generating a switch signal when the current amount exceeds a prescribed value; and
    signal means, coupled to said current detector means and said $\gamma^*$ means, for supplying said $\gamma^*$ means with a predetermined signal when said switch signal is generated, said predetermined signal being independent of said commutation overlapping angle, thereby achieving the commutation of said switching elements independently of the value of said commutation overlapping angle.

12. A load-commutated inverter according to claim 4, further comprising:
    current detector means for detecting the amount of a current of said synchronous motor, and generating a switch signal when the current amount exceeds a prescribed value; and signal means, coupled to said current detector means and said γ* means, for supplying said γ* means with a predetermined signal when said switch signal is generated, said predetermined signal being independent of said commutation overlapping angle, thereby achieving the commutation of said switching elements independently of the value of said commutation overlapping angle.

13. A load-commutated inverter for operating a synchronous motor which includes one or more sets of 3-phase windings, said load-commutated inverter comprising:

n sets of inverters, each being formed with switching elements, coupled respectively to said 3-phase windings, the commutation of each of said switching elements being controlled in accordance with a given advanced control angle, said n being an integer which is equal to or more than 2, and a difference of phase angles between outputs from the n sets of said inverters being substantially 60 degrees/n; and control means, coupled to the n sets of said inverters and being responsive to a commutation overlapping angle of currents supplied from said inverters to the 3-phase windings of said synchronous motor, for controlling said given advanced control angle to retain a relation:

$$u + \gamma^* \leq 60 \text{ degrees}/n$$

wherein u denotes said commutation overlapping angle and γ* corresponds to a reverse-biasing time applied to each of said switching elements.

* * * * *